(12) United States Patent
Miyazaki et al.

(10) Patent No.: US 8,603,697 B2
(45) Date of Patent: Dec. 10, 2013

(54) CATALYST LAYER FOR SOLID POLYMER ELECTROLYTE FUEL CELL INCLUDING CATALYST WITH DENDRITIC STRUCTURE AND METHOD OF PRODUCING THE SAME

(75) Inventors: Kazuya Miyazaki, Atsugi (JP);
Kazuhiro Yamada, Yokohama (JP);
Yoshinobu Okumura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1382 days.

(21) Appl. No.: 11/570,011

(22) PCT Filed: Jun. 24, 2005

(86) PCT No.: PCT/JP2005/012163
§ 371 (c)(1),
(2), (4) Date: Dec. 4, 2006

(87) PCT Pub. No.: WO2006/004023
PCT Pub. Date: Jan. 12, 2006

(65) Prior Publication Data
US 2007/0212591 A1    Sep. 13, 2007

(30) Foreign Application Priority Data

Jun. 30, 2004 (JP) .................................. 2004-194791
May 30, 2005 (JP) .................................. 2005-158097

(51) Int. Cl.
*H01M 4/48* (2010.01)
*H01M 8/10* (2006.01)
*H01M 4/88* (2006.01)
*B01J 23/40* (2006.01)

(52) U.S. Cl.
USPC ........... 429/488; 429/479; 429/481; 429/482; 429/484; 429/485; 429/486; 429/487; 429/137; 502/101; 502/339

(58) Field of Classification Search
None
See application file for complete search history.

(56) References Cited

U.S. PATENT DOCUMENTS 3,765,947 A    10/1973    Felten et al.
4,457,823 A    7/1984    LaConti et al.
(Continued)

FOREIGN PATENT DOCUMENTS

CA    2304157 A1    4/1999
CA    2 367 848 A1    9/2000
(Continued)

OTHER PUBLICATIONS

A. S. Arico et al., "Investigation of a Carbon-Supported Quaternary Pt—Rn—Sn—W Catalyst for Direct Methanol Fuel Cells," Journal of Power Sources, vol. 55, Issue 2, pp. 159-166 (1995).
(Continued)

*Primary Examiner* — Kwang Han
(74) *Attorney, Agent, or Firm* — Fitzpatrick, Cella, Harper & Scinto

(57) ABSTRACT

There is provided a dendritic catalyst layer for a solid polymer electrolyte fuel cell including: a solid polymer electrolyte membrane; electrodes; and catalyst layers each provided between the solid polymer electrolyte membrane and the respective electrode, the catalyst layer for a solid polymer electrolyte fuel cell includes a catalyst with a dendritic structure. The catalyst with a dendritic structure is formed through vacuum evaporation such as reactive sputtering, reactive electron beam evaporation, or ion plating. The catalyst layer for a solid polymer electrolyte fuel cell can improve catalytic activity, catalyst utilization, and substance transport performance in the catalyst layer.

12 Claims, 16 Drawing Sheets

(56) References Cited

U.S. PATENT DOCUMENTS

| | | | |
|---|---|---|---|
| 4,959,132 A | 9/1990 | Fedkiw, Jr. | |
| 5,541,147 A * | 7/1996 | Friedlander et al. | 502/100 |
| 5,879,827 A | 3/1999 | Debe et al. | 429/40 |
| 5,879,828 A | 3/1999 | Debe et al. | 429/41 |
| 6,040,077 A | 3/2000 | Debe et al. | 429/40 |
| 6,120,936 A | 9/2000 | Young et al. | |
| 6,136,412 A | 10/2000 | Spiewak et al. | 428/143 |
| 6,136,704 A | 10/2000 | Maya | |
| 6,270,719 B1 | 8/2001 | Fetcenko et al. | |
| 6,319,293 B1 | 11/2001 | Debe et al. | 29/623.3 |
| 6,461,766 B1 | 10/2002 | Young et al. | |
| 6,740,448 B2 | 5/2004 | Fetcenko et al. | |
| 6,789,757 B2 | 9/2004 | Young et al. | |
| 6,841,512 B1 | 1/2005 | Fetcenko et al. | |
| 6,964,826 B2 | 11/2005 | Ovshinsky et al. | |
| 7,045,484 B2 | 5/2006 | Fetcenko et al. | |
| 7,074,515 B2 | 7/2006 | Yamauchi et al. | 429/40 |
| 7,132,193 B2 | 11/2006 | Fetcenko et al. | |
| 7,462,577 B2 | 12/2008 | Fetcenko et al. | |
| 7,494,739 B2 | 2/2009 | Fetcenko et al. | |
| 2001/0003997 A1 | 6/2001 | Fetcenko et al. | |
| 2002/0037449 A1 | 3/2002 | Binder et al. | 429/42 |
| 2004/0018416 A1 | 1/2004 | Choi et al. | 429/44 |
| 2004/0131919 A1* | 7/2004 | Yasumoto et al. | 429/42 |
| 2005/0051244 A1 | 3/2005 | Fetcenko et al. | |
| 2005/0095479 A1 | 5/2005 | Mardilovich et al. | |
| 2005/0170946 A1 | 8/2005 | Ovshinsky et al. | |
| 2006/0002842 A1* | 1/2006 | Yoon | 423/447.2 |
| 2007/0099066 A1 | 5/2007 | Okumura et al. | |
| 2007/0134544 A1 | 6/2007 | Yamada et al. | |
| 2007/0148531 A1 | 6/2007 | Yoshizawa et al. | |

FOREIGN PATENT DOCUMENTS

| | | | | |
|---|---|---|---|---|
| CA | 2491075 A1 | 6/2004 | | |
| CN | 1451185 A | 10/2003 | | |
| JP | 4-012458 A | 1/1992 | | |
| JP | 8-148151 A | 6/1996 | | |
| JP | 2001-519594 | 10/2001 | | |
| JP | 2002-025561 A | 1/2002 | | |
| JP | 2003-59506 | 2/2003 | | |
| JP | 2003-506850 | 2/2003 | | |
| JP | 2003-109606 | 4/2003 | | |
| JP | 2004-59428 | 2/2004 | | |
| JP | 2004-79438 | 3/2004 | | |
| JP | 2002-110180 | 4/2004 | | |
| JP | 2004-342365 | 12/2004 | | |
| JP | 2005-133205 | 5/2005 | | |
| JP | 2005-142027 | 6/2005 | | |
| JP | 2005-174786 | 6/2005 | | |
| WO | WO 99/19066 | * | 4/1999 | B01J 35/02 |
| WO | 2004/035882 A2 | 4/2004 | | |
| WO | 2004/051783 A1 | 6/2004 | | |

OTHER PUBLICATIONS

Ermete Antolini et al., "Electrocatalysis of Oxygen Reduction on a Carbon Supported Platinum-Vanadium Alloy in Polymer Electrolyte Fuel Cells," Electroclilmica Acta, vol. 48, Issue 3, pp. 263-270 (2002).

S.Y. Cha et al., "Performance of Proton Exchange Membrane Fuel Cell Electrodes Prepared by Direct Deposition of Ultrathin Platinum on the Membrane Surface," 146(11) J. Electrochem. Soc. 4055-60 (1999).

Olivier Antoine et al., "In Situ Electrochemical Deposition of Pt Nanoparticles on Carbon and Inside Nafion," 4(5) Electrochemical and Solid-State Letters A55-A58 (Mar. 2001).

Kyoung Hwan Choi et al., "Electrode Fabrication for Proton Exchange Membrane Fuel Cells by Pulse Electrodeposition," 75(2) Journal of Power Sources 230-235 (Oct. 1998).

Glossary of Technical Terms in Japanese Industrial Standards, 5th Edition, "Physical Vapor Deposition," p. 1988 (Mar. 2001).

Translation of Office Action in Japanese Application No. 2005-158097 (Aug. 2011).

* cited by examiner

_US 8,603,697 B2_

CATALYST LAYER FOR SOLID POLYMER ELECTROLYTE FUEL CELL INCLUDING CATALYST WITH DENDRITIC STRUCTURE AND METHOD OF PRODUCING THE SAME

TECHNICAL FIELD

The present invention relates to a catalyst layer for a solid polymer electrolyte fuel cell, to a method of producing the catalyst layer for a solid polymer electrolyte fuel cell, and to a solid polymer electrolyte fuel cell.

BACKGROUND ART

A solid polymer electrolyte fuel cell is expected to be a future energy-generation apparatus because the solid polymer electrolyte fuel cell has high energy conversion efficiency, is clean, and produces very little noise. In particular, the solid polymer electrolyte fuel cell has recently been used not only as a generator for automobiles and homes, but has also been installed into small electrical instruments such as cellular phones, laptop computers, and digital cameras because of its high energy density to possibly operate for a longer period of time than a conventional secondary battery, and has been attracting attention. However, cost reduction is required for a solid polymer electrolyte fuel cell used as a generator for automobiles and homes, and a catalyst usage is desirably reduced as a way for cost reduction. Practical application of a solid polymer electrolyte fuel cell as a generator for small electrical instruments requires a compact total system and improved power generation efficiency.

Conventionally, an attempt has been made at forming a catalyst into fine particles and supporting the catalyst on carbon particles or the like for three-dimensional dispersion, to thereby increase a surface area and improve catalyst utilization.

Meanwhile, another attempt has been made at forming a catalyst layer into a very small thickness of about several µm, to thereby facilitate substance transport. Further, a catalyst layer was gathered in a vicinity of an electrolyte membrane, to thereby increase an effective surface area of the catalyst.

In particular, in a case where a fuel cell is installed into small electrical instruments, the fuel cell itself needs to be small, and air is often supplied to an air electrode from air holes through natural diffusion (air breathing system) without use of a pump or a blower.

In this case, substance transport at the air electrode often becomes a reaction rate-limiting factor, and thickness reduction of a catalyst layer seems to be effective means. An example of a method of forming a thin catalyst layer involves deposition of Pt or the like on a surface of an electrolyte membrane through sputtering (see S. Y. Cha and W. M. Lee, "J. Electrochem. Soc.", 146, 4055 (1999).

DISCLOSURE OF THE INVENTION

However, the membrane described in the above-mentioned publication is dense and has poor gas permeability. Further, an increased thickness presumably causes cracks in the catalyst layer through expansion and shrinkage of the electrolyte membrane. Attempts have been made at forming a catalyst layer on a surface of a carbon electrode through sputtering or metal plating. However, a rough surface of the carbon electrode inhibits numerous catalysts from becoming in contact with an electrolyte membrane, and high performance has not yet been obtained.

The present invention has been made in view of the above circumstances, and it is an object of the present invention to provide: a catalyst layer for a solid polymer electrolyte fuel cell having improved catalytic activity, and catalyst utilization by forming a dendritic structure in the catalyst layer, and improved substance transport performance in the catalyst layer; and a method of producing the same.

Further, another object of the present invention is to provide a solid polymer electrolyte fuel cell having stable characteristics at lost cost by using the catalyst layer having improved catalytic activity and catalyst utilization.

The present invention has been made through extensive studies for attaining the above-described objects, and has the following constructions.

That is, according to one aspect of the present invention, there is provided a catalyst layer for a solid polymer electrolyte fuel cell including: a solid polymer electrolyte membrane; an electrode; and a catalyst layer provided between the solid polymer electrolyte membrane and the electrode, characterized in that the catalyst layer includes: a catalyst with a dendritic structure; or a catalyst with a multilayer structure having at least one layer with the dendritic structure.

According to another aspect of the present invention, there is provided a catalyst layer for a solid polymer electrolyte fuel cell, characterized in that the catalyst with a dendritic structure or the catalyst with a multilayer structure having at least one layer with the dendritic structure is: platinum oxide; a composite oxide of platinum oxide and an oxide of a metal element except platinum; platinum obtained through reduction treatment of platinum oxide or the composite oxide; a multicomponent metal containing platinum; a-mixture of platinum and an oxide of a metal element except platinum; or a mixture of a multicomponent metal containing platinum and an oxide of a metal element except platinum.

According to another aspect of the present invention, there is provided a catalyst layer for a solid polymer electrolyte fuel cell, characterized in that the metal element except platinum is at least one metal selected from the group consisting of Al, Si, Ti, V, Cr, Fe, Co, Ni, Cu, Zn, Ge, Zr, Nb, Mo, Ru, Rh, Pd, Ag, In, Sn, Hf, Ta, W, Os, Ir, Au, La, Ce, and Nd.

According to another aspect of the present invention, there is provided a catalyst layer for a solid polymer electrolyte fuel cell, characterized in that the catalyst with a dendritic structure has a branch or branched piece with a width of 5 nm or more and 200 nm or less in a shorter direction.

According to another aspect of the present invention, there is provided a catalyst layer for a solid polymer electrolyte fuel cell, characterized in that the catalyst with a dendritic structure has a porosity of 30% or more and less than 95%.

According to another aspect of the present invention, there is provided a catalyst layer for a solid polymer electrolyte fuel cell, characterized in that the catalyst with a dendritic structure is preferably arranged on a catalyst support, and the catalyst support is one member selected from the group consisting of: a carbon support; a platinum-supported carbon support; platinum alloy-supported carbon (where, platinum alloy refers to alloy composed of platinum and at least one metal element selected from the group consisting of Ru, Co, Cr, Ni, Cu, Fe, V, Sn, Rh, In, Pd, and Ru); platinum black; a platinum fine particle layer; or a gold fine particle layer.

According to another aspect of the present invention, there is provided a method of producing the catalyst layer for a solid polymer electrolyte fuel cell, characterized by including forming a catalyst with a dendritic structure through reactive vacuum deposition.

According to another aspect of the present invention, there is provided a solid polymer electrolyte fuel cell, including: a solid polymer electrolyte membrane; a pair of electrodes; and catalyst layers each provided between the solid polymer electrolyte and the respective electrode, characterized in that at least one catalyst layer includes a catalyst with a dendritic structure, or a catalyst with a multilayer structure having at least one layer with the dendritic structure.

The present invention allows improvements on catalytic activity and catalyst utilization by forming a characteristic dendritic fine structure in a catalyst layer, and improvement on substance transport performance in the catalyst layer by reducing a thickness of the catalyst layer. Further, the present invention can provide a fuel cell at an advantageous manufacturing cost through a simple manufacturing method of reactive vacuum deposition such as reactive sputtering, reactive electron beam evaporation, or reactive ion plating.

According to the present invention, there is provided a catalyst layer for a solid polymer electrolyte fuel cell having improved catalytic activity and catalyst utilization by forming in the catalyst layer a dendritic structure or a multilayer structure having at least one layer with the dendritic structure, and improved substance transport performance in the catalyst layer.

Further, the present invention can provide a solid polymer electrolyte fuel cell having stable characteristics at lost cost by using the above-described catalyst layer.

In addition, a method of producing a catalyst layer, according to the present invention, can realize a catalyst layer for a solid polymer electrolyte fuel cell through a simple process at low cost and good reproducibility. The catalyst layer has a dendritic structure or a multilayer structure having at least one layer with the dendritic structure, and thus hardly cracks.

BEST MODE FOR CARRYING OUT THE INVENTION

Hereinafter, preferable embodiments of a catalyst layer for a solid polymer electrolyte fuel cell of the present invention and a method of producing the catalyst layer for a solid polymer electrolyte fuel cell of the present invention will be specifically described with reference to the drawings. The materials, sizes, shapes, relative positions, and the like of component members described in the embodiments do not limit the scope of the present invention unless otherwise noted specifically. Similarly, a manufacturing method described below does not limit the scope of the present invention.

Figure 1:
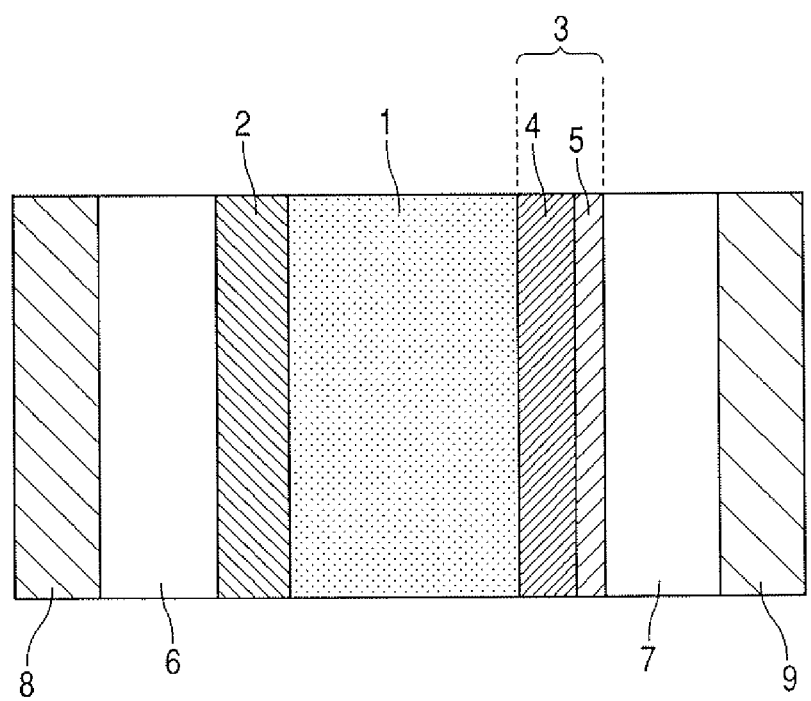
FIG. 1 is an example of a schematic diagram showing a sectional construction of a unit cell of a solid polymer electrolyte fuel cell produced by using a catalyst layer of the present invention.

FIG. 1 is a schematic diagram showing an example of a sectional construction of a unit cell of a solid polymer electrolyte fuel cell produced by using a catalyst layer of the present invention. FIG. 1 shows a solid polymer electrolyte membrane 1 and a pair of catalyst layers arranged on both sides thereof, that is, an anode catalyst layer 2 and a cathode catalyst layer 3 containing a catalyst with a dendritic structure or a catalyst with a multilayer structure having at least one layer with the dendritic structure (referred to as "dendritic catalyst layer"). In Examples of the present invention, a catalyst layer with a dendritic structure or with a multilayer structure having at least one layer with the dendritic structure is arranged by the cathode (air electrode) alone. However, a configuration of the catalyst layer is not limited thereto, and includes: a case where catalyst layers each with a dendritic structure of the present invention or with a multilayer structure having at least one layer with the dendritic layer are arranged by both electrodes; or a case where a catalyst layer with a dendritic structure of the present invention or with a multilayer structure having at least one layer with the dendritic structure is arranged by the anode alone. Various constructions may preferably be selected.

The catalyst layer 3 with a dendritic structure or with a multilayer structure having at least one layer with the dendritic structure is constituted by: a catalyst 4 with a dendritic structure or with a multilayer structure having at least one layer with the dendritic structure; and a catalyst support 5 for supporting the catalyst 4. An anode gas diffusion layer 6 and an anode (fuel electrode) 8 are arranged on an outer side of the anode catalyst layer 2.

A cathode gas diffusion layer 7 and a cathode (air electrode) 9 are arranged on an outer side of the cathode catalyst layer 3 with a dendritic structure or with a multilayer structure having at least one layer with the dendritic structure.

The solid polymer electrolyte membrane 1 may preferably employ a perfluorosulfonic acid polymer with a structure in which a side chain having a sulfonic group on a terminal is bonded to a fluorocarbon skeleton. For example, a polymer in which a sulfonic group is bonded to Teflon (trade name) may preferably be used. To be specific, Nafion (trade name) may preferably be used.

The perfluorosulfonic acid polymer has no crosslinked fluorocarbon skeletons, and the skeletons are bonded together by van der Waals force to form a crystal. Further, several sulfonic groups are aggregated to form a reversed micelle structure, which serves as a proton $H^+$ conduction channel.

In a case where protons $H^+$ migrate through the electrolyte membrane toward the cathode, the protons $H^+$ migrate using water molecules as a medium and the electrolyte membrane must have a function of holding water molecules. Thus, the solid polymer electrolyte membrane must have functions of: transferring protons $H^+$ generated by the anode to the cathode; inhibiting passage of unreacted reaction gases (hydrogen and oxygen); and holding water to a predetermined level. An arbitrary electrolyte membrane may be selected and used as long as the above conditions are satisfied.

The gas diffusion layers 6 and 7 each serve to: supply a fuel gas or air to an electrode reaction region in the catalyst layer of the fuel electrode or air electrode sufficiently and uniformly across the surface of electrode reaction region; emit charges generated through an anode reaction out of the unit cell; and efficiently discharge reaction product water or unreacted gas out of the unit cell. An example of the gas diffusion layer that can preferably be used includes a porous member having electrical conductivity such as carbon cloth or carbon paper.

The catalyst support 5 serves to improve catalytic activity as a promoter, retain a form of the catalyst 4 with a dendritic structure, secure an electron conduction channel, increase a specific surface area, and the like. Examples of the catalyst support 5 that can preferably be used include carbon black, platinum-supported carbon, platinum alloy-supported carbon (where, platinum alloy refers to alloy composed of platinum and at least one metal element selected from the group consisting of Ru, Co, Cr, Ni, Cu, Fe, V, Sn, Rh, In, Pd, and Ru), platinum black, a platinum fine particle layer, and a gold fine particle membrane layer.

In general, an interface between a catalyst and an electrolyte must be sufficiently large and passage of electrode reaction substances (reaction gas, hydrogen gas, and electrons) must be favorable, that is, a three-phase interface must be formed effectively for obtaining a high performance catalyst layer. The catalyst 4 with a dendritic structure of the present invention has such features in that: an electrolyte channel and an electron conduction channel are secured while pores are formed along a direction of the electron conduction channel by providing a dendritic form to the catalyst; and a sufficient gas channel can be secured.

A branch or branched piece of the catalyst with a dendritic structure has such a feature in that its length is 5 nm or more and 200 nm or less in a shorter direction. Here, the length in a shorter direction refers to the minimum size of the branch or branched piece. Note that, the branch or branched piece does not necessarily need to be in a form of a branch or piece, and refers to a basic unit structure constituting a dendritic shape having branch points.

The catalyst 4 with a dendritic structure or with a multilayer structure having at least one layer with the dendritic structure has such a feature in that its porosity is 30% and more and less than 95%, preferably 55% to 75%. Note that, the porosity is calculated by (1-(actual volume of catalyst with dendritic structure)/(volume of space between electrolyte membrane and catalyst support)).

Further, the catalyst support has a thickness of 200 nm or less, preferably 50 nm or less.

Figure 2A:
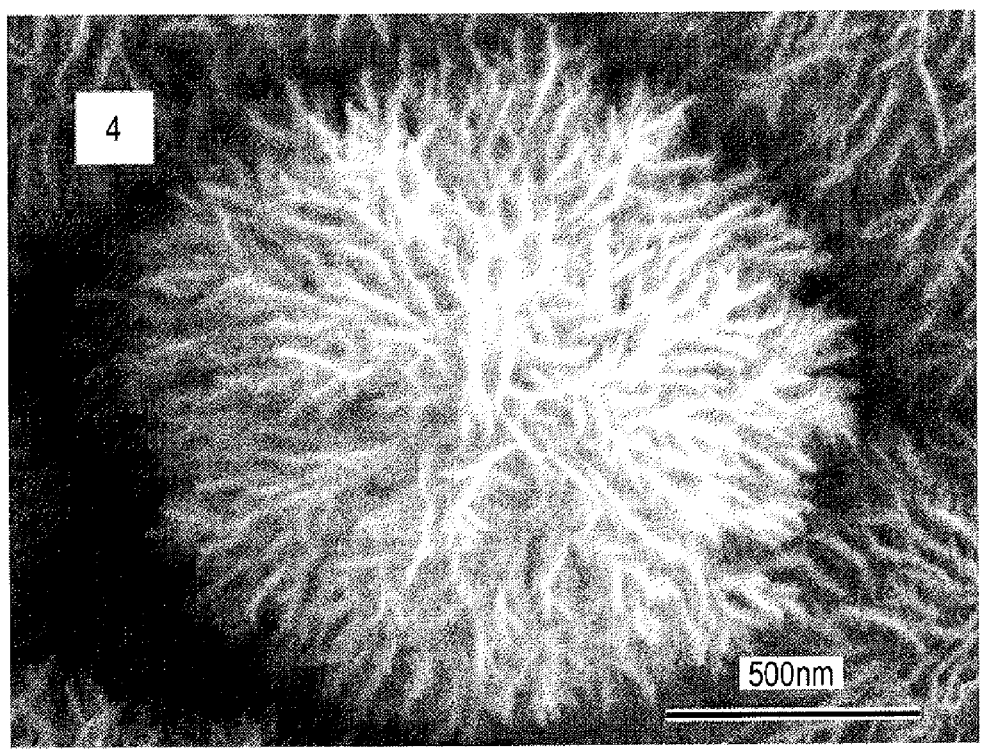
FIG. 2A is a scanning electron microscope (SEM) photograph (magnification: 50,000 times) showing a surface of a thin film of a catalyst with a dendritic structure of the present invention.
Figure 2B:
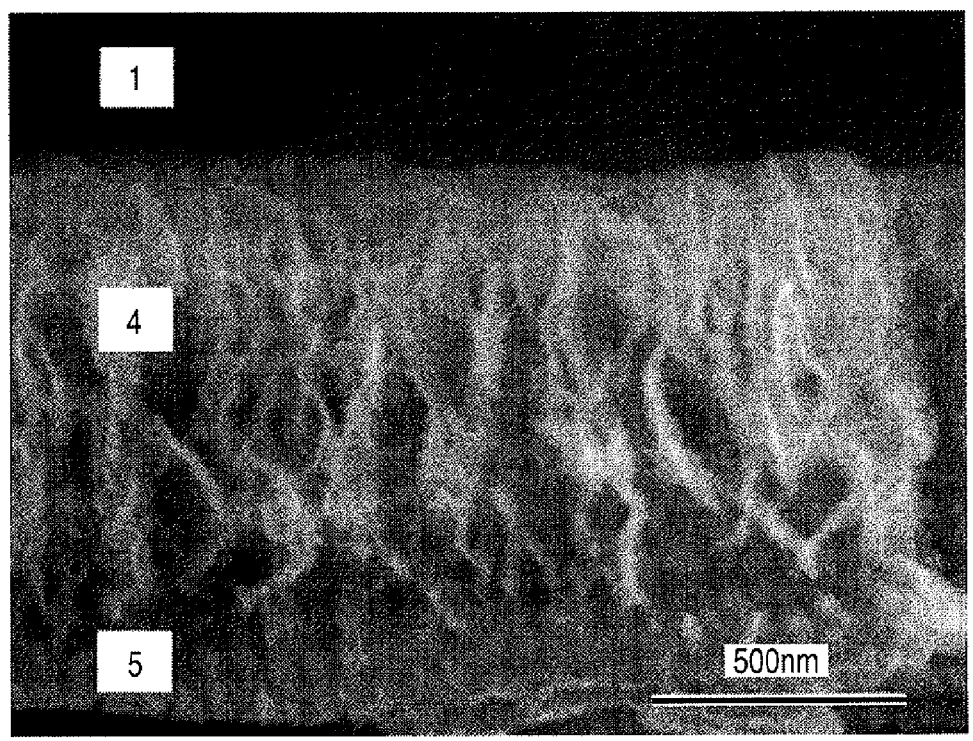
FIG. 2B is a scanning electron microscope (SEM) photograph (magnification: 50,000 times) showing a section of a thin film of an assembly of a dendritic catalyst layer composed of a catalyst with a dendritic structure of the present invention and a catalyst support, and a solid polymer electrolyte membrane.
Figure 2C:
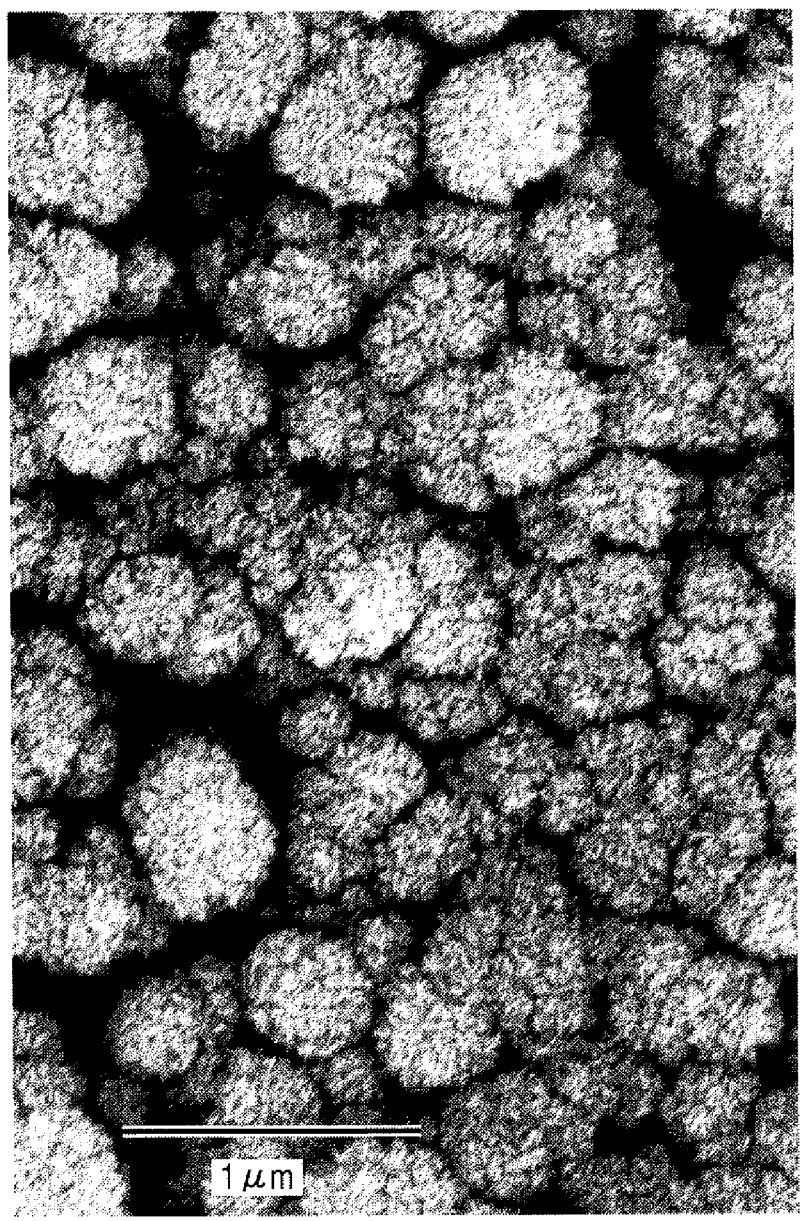
FIG. 2C is a scanning electron microscope (SEM) photograph (magnification: 30,000 times) showing a structure of a catalyst layer in a case where a catalyst with a dendritic structure of the present invention is deposited on carbon black.

FIG. 2A is a scanning electron microscope (SEM) photograph (magnification: 50,000 times) showing a surface of a thin film of the catalyst 4 with a dendritic structure of the present invention. FIG. 2B is a scanning electron microscope (SEM) photograph (magnification: 50,000 times) showing a section of a thin film of an assembly of a dendritic catalyst layer composed of the catalyst 4 with a dendritic structure of the present invention and the catalyst support 5, and the solid polymer electrolyte membrane 1. FIG. 2C is a scanning electron microscope (SEM) photograph (magnification: 30,000 times) showing a surface of a thin film of the catalyst 4 with a dendritic structure of the present invention in a case where carbon black is used as the catalyst support 5.

In FIGS. 2A to 2C, the catalyst with a dendritic structure is composed of platinum oxide, and the catalyst support is composed of gold. The solid polymer electrolyte membrane is composed of Nafion 112, and the catalyst with a dendritic structure is produced through reactive sputtering. As shown in the SEM photograph of FIG. 2B, the catalyst 4 with a dendritic structure grows dendritically in a direction from reference numeral 5 to reference numeral 1 shown in the SEM photograph. The branch or branched piece of the dendritic structure has a width in a shorter direction, that is, a size in parallel with a scale shown in FIG. 2B, of 5 nm or more and 50 nm or less, preferably 20 nm or less.

Increase in substrate temperature during deposition accelerates crystallization of platinum oxide during deposition to reduce a branch density of the dendritic form, resulting in long branches or pieces of the individual dendritic structures. The porosity and pore size of the dendritic catalyst layer may be controlled by using the phenomenon. In particular, the branch or piece of the dendritic structure tends to extend significantly at 85° C. or higher, corresponding to ⅓ of a melting point of platinum oxide. In order to obtain the desired dendritic structure, the substrate temperature may be maintained constant during deposition or may be varied during deposition. To be specific, an operation involving varying of the substrate temperature during deposition, that is, an operation involving deposition at about room temperature once and then increase in substrate temperature to 85° C. or higher, or an operation involving simultaneous annealing from 85° C. or higher and deposition may be performed appropriately. Thus, the pore size and porosity of the catalyst layer may have a desired distribution with respect to a thickness direction.

The catalyst with a dendritic structure shown in FIG. 2C is produced through reactive sputtering by using carbon black as a catalyst support. In a structure shown in FIG. 2C, the branches and branched pieces are aggregated to form a substantially particulate shape, but the shape does not inhibit the effects of the present invention in any way.

The catalyst 4 with a dendritic structure is composed of: platinum oxide; a composite oxide of platinum oxide and an oxide of a metal element except platinum; platinum obtained through reduction treatment of platinum oxide or the composite oxide; a multicomponent metal containing platinum; a mixture of platinum and an oxide of a metal element except platinum; or a mixture of a multicomponent metal containing platinum and an oxide of a metal element except platinum. The metal element except platinum may be at least one metal selected from the group consisting of Al, Si, Ti, V, Cr, Fe, Co, Ni, Cu, Zr, Nb, Mo, Ru, Rh, Pd, Ag, In, Sn, Hf, Ta, W, Os, Ir, Au, La, Ce, and Nd.

The upper limit and lower limit of a composition ratio between platinum and the metal element except platinum cannot be defined uniquely, but improvement in catalytic activity can be confirmed with a content of the metal element except platinum of about 1 atomic %. A content thereof is preferably 3 to 80 atomic %, and significant reduction in catalytic activity is confirmed with a content thereof exceeding 80 atomic %.

In a case where a catalyst layer of the present invention is composed of a composite oxide of platinum oxide and an oxide of a metal element except platinum, platinum obtained through reduction treatment of the composite oxide, a multicomponent metal containing platinum, a mixture of platinum and an oxide of a metal element except platinum, or a mixture of a multicomponent metal containing platinum and an oxide of a metal element except platinum, the deposition preferably involves: an operation (1) for providing a layer of platinum oxide; and then an operation (2) for providing a composite layer, multicomponent metal layer, or mixture layer repeated at least once. In this way, a dendritic form may preferably be formed in the catalyst layer. A deposition time for each of the operations (1) and (2), and a ratio of the deposition times may be arbitrarily controlled, to thereby obtain the desired dendritic catalyst layer.

The catalyst 4 with a dendritic structure may be produced easily through vapor evaporation in a broad sense such as reactive sputtering, reactive electron beam evaporation, or reactive ion plating. For example, in order to produce platinum oxide $PtO_x$ with a dendritic structure through reactive sputtering, Ar and $O_2$ gases are introduced for sputtering a platinum target, to thereby form platinum oxide with a dendritic structure.

Further, in order to produce a composite oxide $PtM1_{x1}M2^{x2} \ldots Mn_{xn}O_y$ ($\Sigma_{n=1\ldots n}$=0.3 to 0.8) with a dendritic structure containing platinum, Ar and $O_2$ gasses are introduced for sputtering a platinum-M1-...-Mn alloy target, to thereby form a composite oxide with a dendritic structure containing platinum.

The reasons for formation of a dendritic structure in platinum oxide or in a composite oxide of platinum oxide and an oxide of a metal element except platinum relate to both deposition conditions such as oxygen partial pressure, input power, and substrate temperature, and surface roughness of the substrate. A case where those conditions are not satisfied results in a plate structure, an aggregated form of fine particles, or a dense columnar structure with substantially no pores.

In the present invention, the surface roughness of the substrate is preferably in a 0.1 to 10 micron order. The level of the surface roughness of the substrate is more preferably in an order of 0.1 to 10 times that of the thickness of platinum oxide or composite oxide of platinum oxide and an oxide of a metal element except platinum to be formed.

Various methods may be employed as a method of producing a solid polymer electrolyte fuel cell having a catalyst layer containing a catalyst with a dendritic structure of the present invention or with a multilayer structure having at least one layer with the dendritic structure. Hereinafter, a method of producing a solid polymer electrolyte fuel cell having a construction shown in FIG. 1 will be described as an example.

(1) A cathode dendritic catalyst layer is prepared.

Au as a catalyst support is deposited through electron beam evaporation on a polytetrafluoroethylene (PTFE) sheet as a transfer layer to a solid polymer electrolyte membrane. Then, a platinum oxide catalyst with a dendritic structure is formed thereon through reactive sputtering. Subsequently, the platinum oxide catalyst with a dendritic structure is subjected to hydrogen reduction treatment, to thereby obtain a platinum/gold catalyst layer with a dendritic structure.

Then, a mixed suspension of PTFE and Nafion (trade name: Nafion, available from Dupont) is applied onto the platinum/gold catalyst layer with a dendritic structure for effective formation of an electrolyte channel on a catalyst surface and appropriate water repellent treatment.

(2) An anode catalyst layer is prepared.

A platinum-supported carbon catalyst is formed in the same manner as in the step (1) on a PTFE sheet by using a doctor blade. A catalyst slurry to be used here is a kneaded product of platinum-supported carbon (trade name: HiSPEC 4000, available from Johnson Matthey Plc), Nafion, PTFE, IPA (2-ethanol), and water.

(3) A solid polymer electrolyte membrane (trade name: Nafion 112, available from Dupont) is sandwiched by a pair of catalyst layers produced in the steps (1) and (2) such that the PTFE sheets are on the outer sides, and the whole is subjected to hot pressing. Then, the) PTFE sheets are peeled off, resulting in an assembly of the electrolyte membrane and the pair of catalyst layers obtained by transferring the pair of catalyst layers onto the solid polymer electrolyte membrane and assembling the electrolyte membrane and the pair of catalyst layers.

(4) The assembly is sandwiched by a carbon cloth (trade name: LT1400-W, available from E-TEK Div. of De Nora N.A., Inc.) as gas diffusion layers, and further sandwiched by a fuel electrode and an air electrode, to thereby produce a unit cell.

The present invention is not limited to a solid polymer electrolyte fuel cell having a construction of a unit cell as described above, and also includes a solid polymer electrolyte fuel cell having a construction produced by stacking a plurality of unit cells.

EXAMPLES

Next, the present invention will be described in more detail with reference to specific examples.

Example 1

Example 1 shows an example of manufacturing a solid polymer electrolyte fuel cell having a construction shown in FIG. 1 according to an embodiment of the present invention.

Hereinafter, detailed description will be made of manufacturing steps of the solid polymer electrolyte fuel cell according to Example 1.

(Step 1)

In Step 1, a dendritic catalyst layer of the present invention was produced.

A gold fine particle layer as a catalyst support was formed to a thickness of 50 nm through electron beam evaporation on a PTFE sheet (NITOFLON, available from Nitto Denko Corporation) as a transfer layer to a polymer electrolyte membrane. Further, a platinum oxide catalyst with a dendritic structure was formed thereon to a thickness of 1,000 nm through reactive sputtering. The platinum oxide catalyst had a porosity of 55%. At this time, an amount of Pt supported was 0.34 mg/cm$^2$. The reactive sputtering was performed under the conditions of: a total pressure of 4 Pa; an oxygen flow ratio ($Q_{O2}/(Q_{Ar}+Q_{O2})$) of 70%; a substrate temperature of 80° C.; and an input power of 4.9 W/cm$^2$.

A mixed suspension of PTFE and Nafion was applied thereon for effective formation of an electrolyte channel on a catalyst surface and appropriate water repellent treatment.

(Step 2)

In Step 2, a platinum-supported carbon catalyst layer was produced as a catalyst layer pairing with the catalyst layer with a dendritic structure produced in Step 1.

A platinum-supported carbon catalyst was formed on a PTFE sheet as a transfer layer to a polymer electrolyte membrane by using a doctor blade. A catalyst slurry to be used here was a kneaded product of platinum-supported carbon (trade name: HiSPEC 4000, available from Johnson Matthey Plc), Nafion, PTFE, IPA, and water. At this time an amount of Pt supported was 0.35 mg/cm$^2$. The platinum-supported carbon catalyst layer had a thickness of about 30 µm.

(Step 3)

A solid polymer electrolyte membrane (Nafion 112, available from Dupont) was sandwiched by the pair of catalyst layers produced in Steps 1 and 2, and the whole was subjected to hot pressing under pressing conditions of 8 MPa, 150° C., and 1 minute.

The PTFE sheets were peeled off, resulting in transfer of the pair of catalyst layers onto the polymer electrolyte membrane and assembly of the electrolyte membrane and the pair of catalyst layers.

(Step 4)

The dendritic catalyst layer of the present invention was used as a cathode catalyst layer, and the platinum-supported carbon catalyst layer was used as an anode catalyst layer. The assembly was sandwiched by a carbon cloth (trade name: LT1200-W, available from E-TEK Div. of De Nora N.A., Inc.) as gas diffusion layers, and further sandwiched by a fuel electrode and an air electrode, to thereby form a unit cell.

Figure 3:
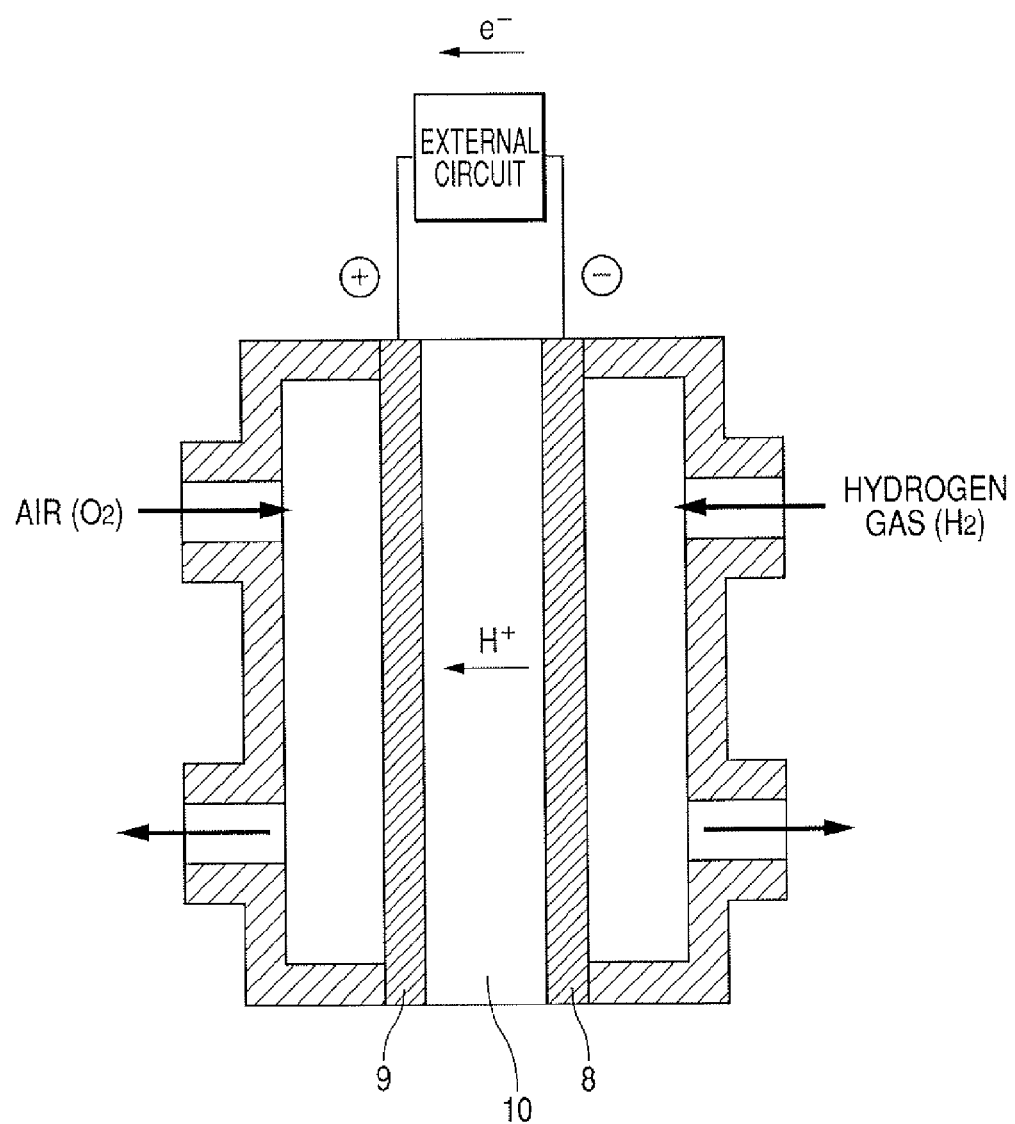
FIG. 3 is a schematic diagram of evaluation equipment for a solid polymer electrolyte fuel cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 4. Note that, reference numeral 10 represents a membrane-electrode assembly.

Figure 4:
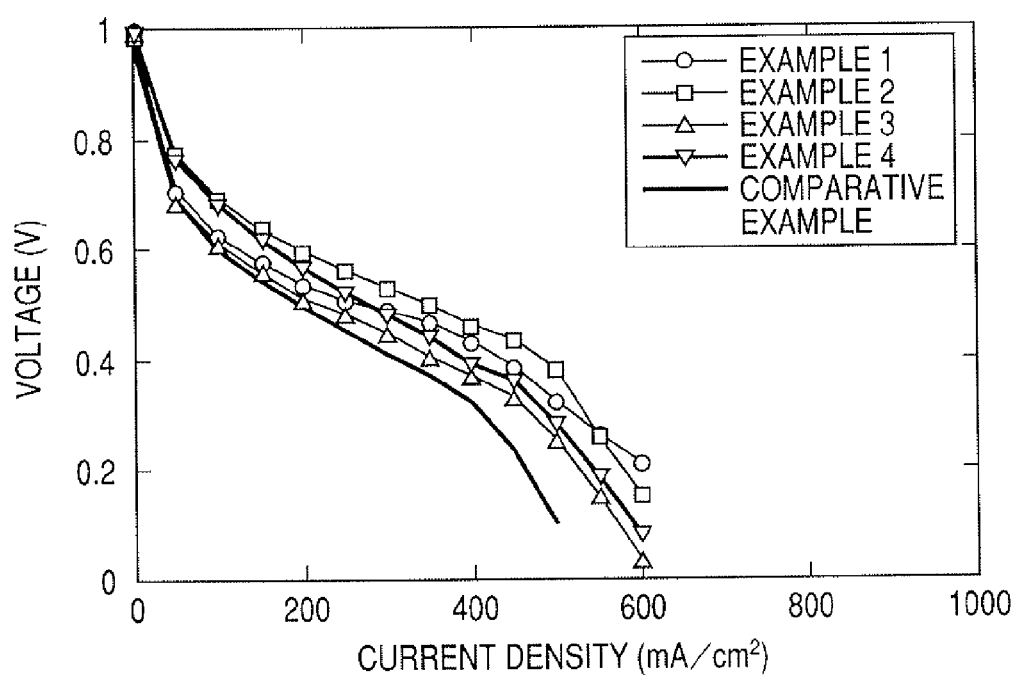
FIG. 4 is a graph showing characteristics of solid polymer electrolyte fuel cells produced by using respective dendritic catalyst layers of Examples 1 to 4 of the present invention and those of a solid polymer electrolyte fuel cell of Comparative Example 1.

FIG. 4 also shows current-voltage characteristics of an example of a unit cell employing the platinum-supported carbon catalyst produced in Step 2 for each of the cathode catalyst layer and the anode catalyst layer as Comparative Example 1. The platinum-supported carbon catalyst layer had a thickness of about 30 µm.

First, a current density of the unit cells was compared at 900 mV, which falls within a reaction rate-limiting region, resulting in 4.5 mA/cm$^2$ for Example 1 and 2.0 mA/cm$^2$ for Comparative Example 1. The current density was divided by the amount of Pt supported, to provide a specific catalytic activity. The specific catalytic activity of the unit cells was compared, resulting in 13.2 A/g for Example 1 and 5.7 A/g for Comparative Example 1.

The current density of the unit cells was compared in a limiting current region, resulting in 600 mA/cm$^2$ or more for Example 1 and 520 mA/cm$^2$ for Comparative Example 1. That is, the catalyst layer of Example 1 had improved substance transport performance in the catalyst layer compared with that of the catalyst layer of Comparative Example 1, and thus deterioration of fuel cell characteristics due to diffusion polarization was significantly suppressed.

Example 2

Example 2 shows an example of a solid polymer electrolyte fuel cell having a construction shown in FIG. 1 according to an embodiment of the present invention, which was manufactured by using a catalyst layer and a manufacturing method according to the present invention.

Hereinafter, detailed description will be made of only Step 1 of the manufacturing step of the solid polymer electrolyte fuel cell according to Example 2, which differs in construction and manufacturing method from those of Example 1.

(Step 1)

In Step 1, a dendritic catalyst layer of the present invention was produced.

A gold fine particle layer as a catalyst support was formed to a thickness of 50 nm through electron beam evaporation on a PTFE sheet (NITOFLON, available from Nitto Denko Corporation) as a transfer layer to a polymer electrolyte membrane. Further, a platinum oxide catalyst with a dendritic structure was formed thereon to a thickness of 1,000 nm through reactive sputtering. At this time, an amount of Pt supported was 0.27 mg/cm$^2$. The reactive sputtering was performed under the conditions of: a total pressure of 4 Pa; an oxygen flow ratio ($Q_{O2}/(Q_{Ar}+Q_{O2})$) of 70%; a substrate temperature of 80° C.; and an input power of 4.9 W/cm$^2$. Subsequently, the platinum oxide catalyst with a dendritic structure was subjected to reduction treatment at 120° C. for 30 minutes in a 2% H$_2$/He atmosphere (1 atm), to thereby obtain a platinum/gold catalyst layer with a dendritic structure on a PTFE sheet.

Then, a mixed suspension of PTFE and Nafion was applied thereon for effective formation of an electrolyte channel on a catalyst surface and appropriate water repellent treatment.

The subsequent steps were performed in the same manner as in Example 1, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 4.

FIG. 4 also shows current-voltage characteristics of an example of a unit cell employing the platinum-supported carbon catalyst produced in Step 2 of Example 1 for each of the cathode catalyst layer and the anode catalyst layer as Comparative Example 1. The platinum-supported carbon catalyst layer had a thickness of about 30 µm.

First, a current density of the unit cells was compared at 900 mV, which falls within a reaction rate-limiting region, resulting in 6.8 mA/cm$^2$ for Example 2 and 2.0 mA/cm$^2$ for Comparative Example 1. The current density was divided by the amount of Pt supported, to provide a specific catalytic activity. The specific catalytic activity of the unit cells was compared, resulting in 25.3 A/g for Example 2 and 5.7 A/g for Comparative Example 1. That is, the catalyst layer of Example 2 had improved catalytic activity compared with that of the catalyst layer of Comparative Example 1.

The current density of the unit cells was compared in a limiting current region, resulting in 600 mA/cm² or more for Example 2 and 520 mA/cm² for Comparative Example 1. That is, the catalyst layer of Example 2 had improved substance transport performance in the catalyst layer compared with that of the catalyst layer of Comparative Example 1, and thus deterioration of fuel cell characteristics due to diffusion polarization was significantly suppressed.

Example 3

Example 3 shows an example of manufacturing a solid polymer electrolyte fuel cell having a construction shown in FIG. 1 according to an embodiment of the present invention.

Hereinafter, detailed description will be made of manufacturing steps of the solid polymer electrolyte fuel cell according to Example 3.
(Step 1)

In Step 1, a dendritic catalyst layer of the present invention was produced.

A platinum oxide catalyst with a dendritic structure was formed on a gas diffusion layer (LT1400-W, available from E-TEK Div. of De Nora N.A., Inc.) having carbon black applied thereon in advance. An anode catalyst was formed to a thickness of 20 nm, and a cathode catalyst was formed to a thickness of 1,000 nm. At this time, an amount of Pt supported was 0.01 mg/cm² for the anode catalyst, and 0.34 mg/cm² for the cathode catalyst. The reactive sputtering was performed under the conditions of: a total pressure of 4 Pa; an oxygen flow ratio ($Q_{O2}/(Q_{Ar}+Q_{O2})$) of 70%; and an input power of 4.9 W/.cm². Subsequently, the platinum oxide catalyst with a dendritic structure was subjected to reduction treatment at 120° C. for 30 minutes in a 2% $H_2$/He atmosphere (1 atm), to thereby obtain a platinum catalyst layer with a dendritic structure on a gas diffusion layer.

Then, the resultant was impregnated with a mixed suspension of PTFE and Nafion for effective formation of an electrolyte channel on a catalyst surface and appropriate water repellent treatment. (Step 2)

A solid polymer electrolyte membrane (Nafion 112, available from Dupont) was sandwiched by the pair of gas diffusion layers each having a dendritic catalyst produced in Step 1, and the whole was subjected to hot pressing under pressing conditions of 3 MPa, 150° C., and 1 minute, to thereby produce a polymer electrolyte membrane-catalyst electrode assembly including the gas diffusion layers.
(Step 3)

The membrane-electrode assembly produced in Step 2 was sandwiched by a fuel electrode and an air electrode, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 4.

FIG. 4 also shows current-voltage characteristics of an example of a unit cell employing a platinum-supported carbon catalyst for each of the cathode catalyst layer and the anode catalyst layer as Comparative Example 1.

First, a current density of the unit cells was compared at 900 mV, which falls within a reaction rate-limiting region, resulting in 4.1 mA/cm² for Example 3 and 2.0 mA/cm² for Comparative Example 1. The current density was divided by the amount of Pt supported, to provide a specific catalytic activity. The specific catalytic activity of the unit cells was compared, resulting in 12.1 A/g for Example 3 and 5.7 A/g for Comparative Example 1.

The current density of the unit cells was compared in a limiting current region, resulting in 600 mA/cm² or more for Example 3 and 520 mA/cm² for Comparative Example 1. That is, in the catalyst layer of Example 3 deterioration of fuel cell characteristics due to resistance polarization and diffusion polarization was significantly suppressed compared with that in the catalyst layer of Comparative Example 1.

Example 4

Example 4 shows an example of a solid polymer electrolyte fuel cell having a construction shown in FIG. 1 according to an embodiment of the present invention, which was manufactured by using a catalyst layer and a manufacturing method according to the present invention.

Hereinafter, detailed description will be made of only Step 1 and Step 2 of the manufacturing steps of the solid polymer electrolyte fuel cell according to Example 1 as Step 1 of Example 4, which differ in construction and manufacturing method from those of Example 1.
(Step 1)

In Step 1, a dendritic catalyst layer of the present invention was produced.

A platinum oxide catalyst with a dendritic structure was formed on a PTFE sheet having a platinum-supported carbon catalyst (20% Pt on Vulcan XC-72, available from available from E-TEK Div. of De Nora N.A., Inc.) applied thereon. An anode catalyst was formed to a thickness of 20 nm, and a cathode catalyst was formed to a thickness of 1,000 nm. At this time, an amount of Pt supported was 0.01 mg/cm² for the anode catalyst, and 0.54 mg/cm² for the cathode catalyst. The reactive sputtering was performed under the conditions of: a total pressure of 4 Pa.; an oxygen flow ratio ($Q_{O2}/(Q_{Ar}+Q_{O2})$) of 70%;. and an input power of 4.9 W/cm². Subsequently, the platinum oxide catalyst with a dendritic structure was subjected to reduction treatment at 120° C. for 30 minutes in a 2% $H_2$/He atmosphere (1 atm), to thereby obtain a platinum catalyst layer with a dendritic structure on a PTFE sheet.

Then, the resultant was impregnated with a mixed suspension of PTFE and Nafion for effective formation of an electrolyte channel on a catalyst surface and appropriate water repellent treatment.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current voltage-characteristics shown in FIG. 4.

FIG. 4 also shows current-voltage characteristics of an example of a unit cell employing a platinum-supported carbon catalyst for each of the cathode catalyst layer and the anode catalyst layer as Comparative Example 1.

First, a current density of the unit cells was compared at 900 mV, which falls within a reaction rate-limiting region, resulting in 6.5 mA/cm² for Example 4 and 2.0 mA/cm for Comparative Example 1. The current density was divided by the amount of Pt supported, to provide a specific catalytic activity. The specific catalytic activity of the unit cells was compared, resulting in 12.0 A/g for Example 4 and 5.7 A/g for Comparative Example 1.

The current density of the unit cells was compared in a limiting current region, resulting in 600 mA/cm$^2$ or more for Example 4 and 520 mA/cm$^2$ for Comparative Example 1. That is, in the catalyst layer of Example 4 deterioration of fuel cell characteristics due to resistance polarization and diffusion polarization was significantly suppressed compared with that in the catalyst layer of Comparative Example 1.

Example 5

Example 5 shows an example of manufacturing a solid polymer electrolyte fuel cell having a construction shown in FIG. 1 according to an embodiment of the present invention. Hereinafter, detailed description will be made of only the step of manufacturing steps of the solid polymer electrolyte fuel cell according to Example 5, which differs in construction and manufacturing method from those of Example 1.
(Step 1)

In Step 1, a dendritic catalyst layer of the present invention was produced.

A gold thin film was formed to a thickness of 50 nm through electron beam vacuum evaporation on a PTFE sheet (NITOFLON, available from Nitto Denko Corporation) as a transfer layer to a polymer electrolyte membrane. Further, a platinum oxide catalyst with a dendritic structure shown in FIGS. 5A and 5B was formed thereon to a thickness of 1,300 nm through reactive sputtering. The reactive sputtering was performed under the conditions of: a total pressure of 5 Pa; an oxygen flow ratio ($Q_{O2}/(Q_{Ar}+Q_{O2})$) of 70%; a substrate temperature of 200° C.; and an RF input power for the cathode of 5.5 W/cm$^2$. The substrate temperature of 200° C. provided pieces in the dendritic structure having an average size of several times greater in a shorter direction and several tens times greater in a longer direction compared with those obtained at the substrate temperature of 80° C.

Subsequently, the catalyst with a dendritic structure was subjected to reduction treatment at 120° C. for 30 minutes in a 2% H$_2$/He atmosphere at 0.1 MPa (1 atm), to thereby obtain a dendritic catalyst layer having a structure shown in FIGS. 5A and 5B on a PTFE sheet. No great changes were observed before and after the reduction treatment. An amount of Pt supported was 0.35 mg/cm$^2$, and the catalyst layer had a porosity of 85.7%.

Then, an appropriate amount of a Nafion solution (5 wt %, available from Wako Pure Chemical Industries, Ltd.) was dropped onto the obtained catalyst layer, and a solvent was evaporated in vacuum, to thereby form an electrolyte channel on a catalyst surface.
(Step 2)

In Step 2, a platinum black catalyst layer was produced as a catalyst layer pairing with the catalyst layer produced in Step 1.

A platinum black catalyst layer was formed on a PTFE sheet as a transfer layer to a polymer electrolyte membrane by using a doctor blade. A catalyst slurry to be used here is a kneaded product of platinum black (trade name: HiSPEC 1000, available from Johnson Matthey Plc), Nafion, IPA, and water. At this time, an amount of Pt supported was 4.96 mg/cm$^2$, and the catalyst layer had a thickness of about 30 μm.

The subsequent steps were performed in the same manner as in Example 1, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 6.

Figure 6:
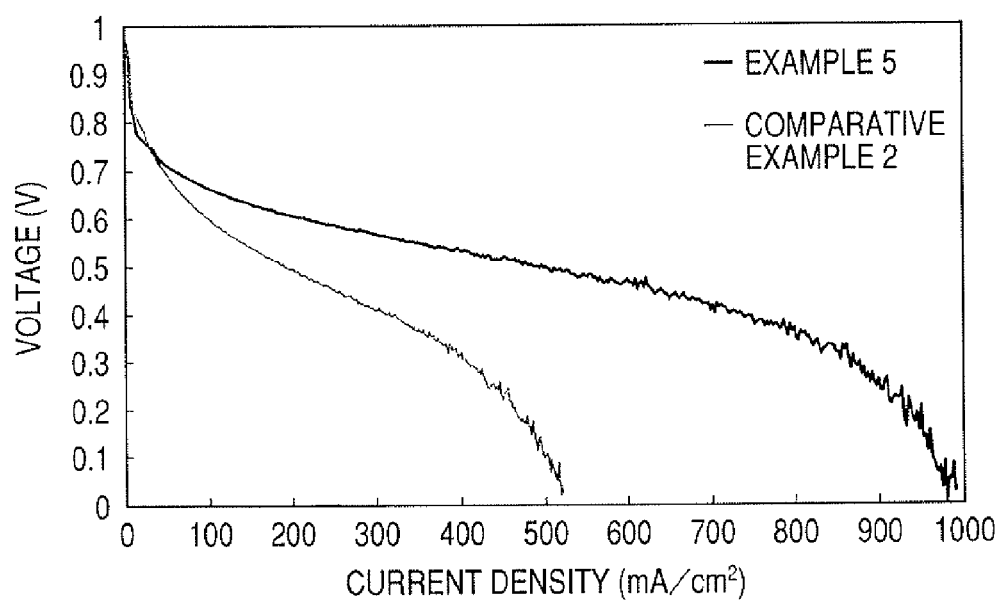
FIG. 6 is a graph showing characteristics of a solid polymer electrolyte fuel cell produced by using a dendritic catalyst layer of Example 5 of the present invention and those of a solid polymer electrolyte fuel cell of Comparative-Example 2.

FIG. 6 also shows current-voltage characteristics of an example of a unit cell employing the platinum black catalyst layer for the anode catalyst layer and the platinum-supported carbon catalyst layer produced in Step 2 of Example 1 for the cathode catalyst layer as Comparative Example 2.

First, a current density of the unit cells was compared at 900 mV, which falls within a reaction rate-limiting region, resulting in 6.0 mA/cm$^2$ for Example 5 and 2.0 mA/cm$^2$ for Comparative Example 2. The current density was divided by the amount of Pt supported, to provide a specific catalytic activity. The specific catalytic activity of the unit cells was compared, resulting in 17.1 A/g for Example 5 and 5.7 A/g for Comparative Example 2. That is, the catalyst layer of Example 5 had improved catalytic activity compared with that of the catalyst layer of Comparative Example 2.

The current density of the unit cells was compared in a limiting current region, resulting in 980 mA/cm$^2$ or more for Example 5 and 520 mA/cm$^2$ for Comparative Example 2.

Figure 5A:
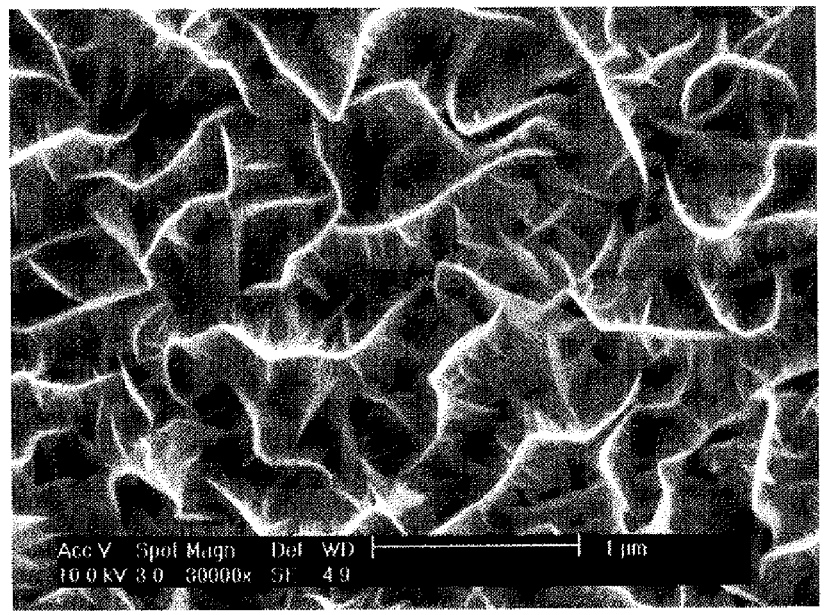
FIG. 5A is a scanning electron microscope (SEM.) photograph showing a surface structure of a catalyst layer of Example 5 of the present invention.
Figure 5B:
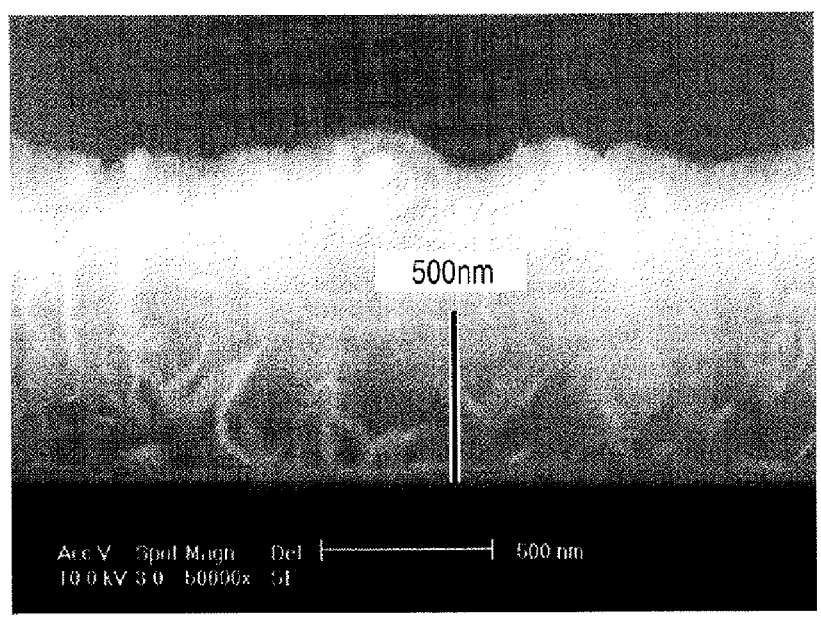
FIG. 5B is a scanning electron microscope (SEM) photograph showing a sectional structure of the catalyst layer of Example 5 of the present invention.

That is, the catalyst layer of Example 5 had large pores as shown in FIGS. 5A and 5B, a dendritic structure having a large porosity, and a small thickness compared with that of the catalyst layer of Comparative Example 2. Thus, the catalyst layer of Example 5 had improved substance transport performance in the air electrode, and deterioration of fuel cell characteristics due to diffusion polarization was significantly suppressed compared with that of the catalyst layer of Comparative Example 2.

Example 6

Example 6 shows an example of a solid polymer electrolyte fuel cell having a construction shown in FIG. 1 according to an embodiment of the present invention, which was manufactured by using a catalyst layer and a manufacturing method according to the present invention.

Hereinafter, detailed description will be made of only Step 1 of the manufacturing step of the solid polymer electrolyte fuel cell according to Example 6, which differs in construction and manufacturing method from those of Example 1.
(Step 1)

In Step 1, a catalyst layer with a multilayer structure having at least one layer with a dendritic structure of the present invention was produced.

A gold fine particle layer as a catalyst support was formed to a thickness of 50 nm through electron beam evaporation on a PTFE sheet (NITOFLON, available from Nitto Denko Corporation) as a transfer layer to a polymer electrolyte membrane. Further, a platinum oxide catalyst layer with a dendritic structure was formed thereon to a thickness of 500 nm through reactive sputtering. Furthermore, a composite oxide layer of platinum oxide and copper oxide was formed thereon to a thickness of 500 nm through simultaneous reactive sputtering of platinum and copper to an atomic % ratio of platinum to copper of 93:7. At this time, a total amount of Pt supported was, 0.34 mg/cm$^2$. The reactive sputtering was performed under the conditions of: a total pressure of 4 Pa for each layer; an oxygen flow ratio ($Q_{O2}/(Q_{Ar}+Q_{O2})$) of 70%; a substrate temperature of 80° C.; and an input power of 4.9 W/cm$^2$. Subsequently, the obtained two-layer platinum oxide catalyst having one layer with a dendritic structure was subjected to reduction treatment at 120° C. for 30 minutes in a 2% H$_2$/He atmosphere.(1 atm), to thereby obtain a platinum-copper oxide/platinum/gold catalyst layer having one layer with a dendritic structure on a PTFE sheet.

Figure 7:
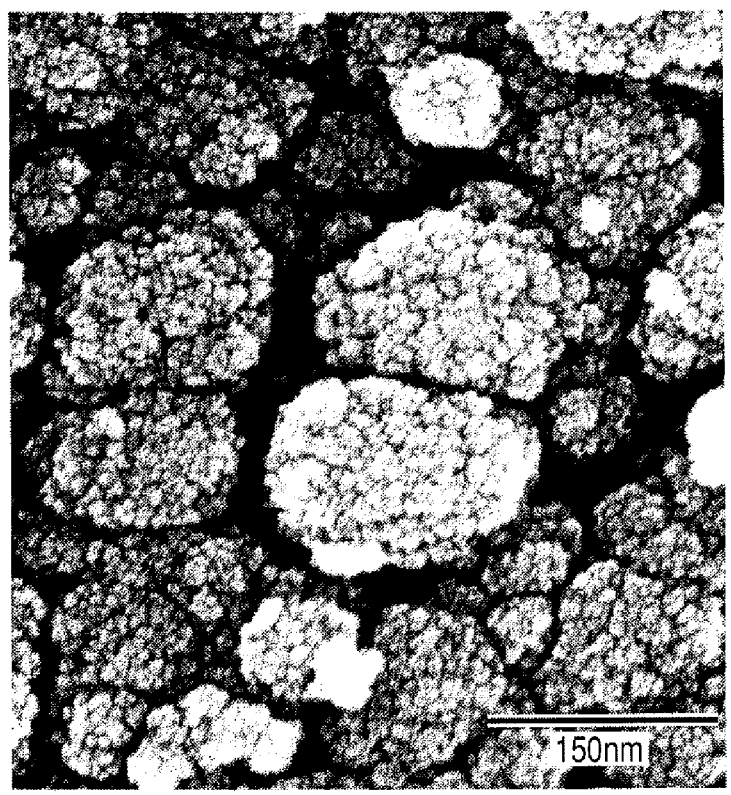
FIG. 7 is a scanning electron microscope (SEM) photograph showing a structure of a catalyst layer of Example 6 of the present invention.

FIG. 7 is a scanning electron microscope (SEM) photograph (magnification: 200,000 times) showing a surface of a platinum-copper oxide thin film of the platinum-copper oxide/platinum/gold catalyst layer.

Then, a mixed suspension of PTFE and Nafion was applied thereon for effective formation of an electrolyte channel on a catalyst surface and appropriate water repellent treatment.

The subsequent steps were performed in the same manner as in Example 1, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby. obtain current-voltage characteristics shown in FIG. 8.

Figure 8:
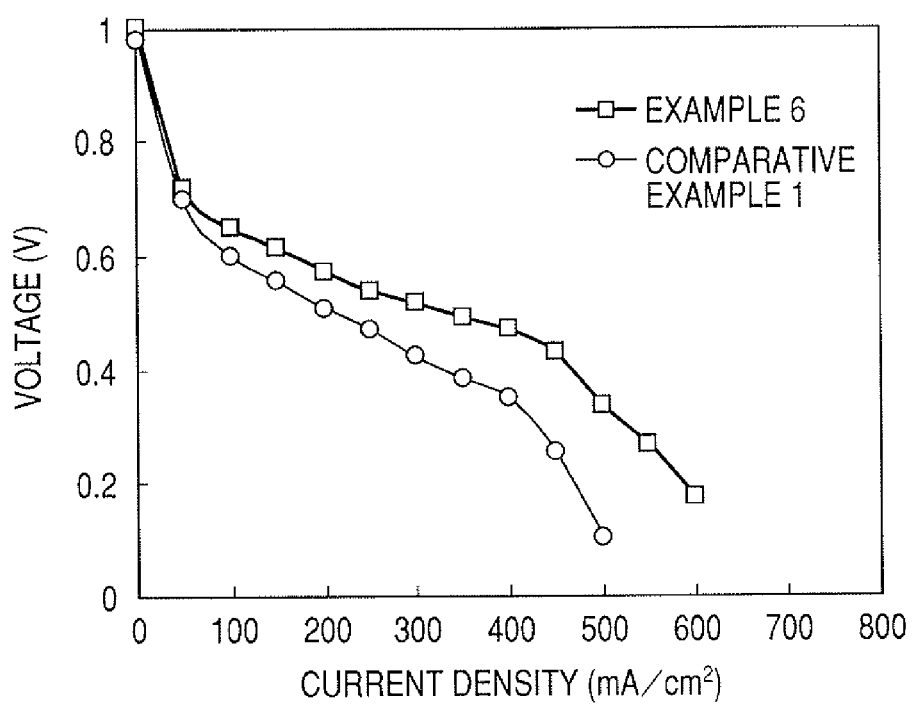
FIG. 8 is a graph showing characteristics of a solid polymer electrolyte fuel cell produced by using a dendritic catalyst layer of Example 6 of the present invention and those of a solid polymer electrolyte fuel cell of Comparative Example 1.

FIG. 8 also shows current-voltage characteristics of an example of a unit cell employing the platinum-supported carbon catalyst produced in Step 2 for each of the cathode catalyst layer and the anode catalyst layer as Comparative Example 1.

First, a current density of the unit cells was compared at 900 mV, which falls within a reaction rate-limiting region, resulting in 6.8 mA/cm$^2$ for Example 6 and 2.0 mA/cm for Comparative Example 1. The current density was divided by the amount of Pt supported, to provide a specific catalytic activity. The specific catalytic activity of the unit cells was compared, resulting in 20.0 A/g for Example 6 and 5.7 A/g for Comparative Example 1. That is, the catalyst layer of Example 6 had improved catalytic activity compared with that of the catalyst layer of Comparative Example 1.

The current density of the unit cells was compared in a limiting current region, resulting in 600 mA/cm$^2$ or more for Example 6 and 520 mA/cm$^2$ for Comparative Example 1 That is, the catalyst layer of Example 6 had improved substance transport performance in the catalyst layer compared with that in the catalyst layer of Comparative Example 1, and thus deterioration of fuel cell characteristics due to diffusion polarization was significantly suppressed.

Example 7

Example 7 shows an example of manufacturing a solid polymer electrolyte fuel cell having a construction shown in FIG. 1 according to an embodiment of the present invention.

Hereinafter, detailed description will be made of only step of the manufacturing step of the solid polymer electrolyte fuel cell according to Example 7, which differ in construction and manufacturing method from those of Example 5.

(Step 1)

In Step 1, a composite oxide catalyst layer with a dendritic structure of the present invention was produced.

A gold thin film was formed to a thickness of 50 nm through electron beam vacuum evaporation on a PTFE sheet (NITOFLON, available from Nitto Denko Corporation) as a transfer layer to a polymer electrolyte membrane. Further, a platinum oxide layer and a platinum oxide-copper oxide composite layer were alternatively and repeatedly deposited thereon through reactive sputtering, to thereby form a dendritic composite oxide catalyst layer having a thickness of 4.2 µm. Each platinum oxide layer was deposited to a thickness of 10 nm, and each composite oxide layer was deposited to a thickness of 30 nm. The reactive sputtering was performed under the conditions of: a total pressure of 5 Pa; an oxygen flow ratio ($Q_{O2}/(Q_{Ar}+Q_{O2})$) of 70%; a substrate temperature of 25° C.; an RF input power for the Pt cathode of 3.6 W/cm$^2$; and an RF input power for the Cu cathode of 8.7 W/cm$^2$. The results of XPS and EDX analyses confirmed that the dendritic composite oxide catalyst was composed of a composite of platinum oxide and CuO with a molecule number ratio of about 77 to 23.

Figure 9:
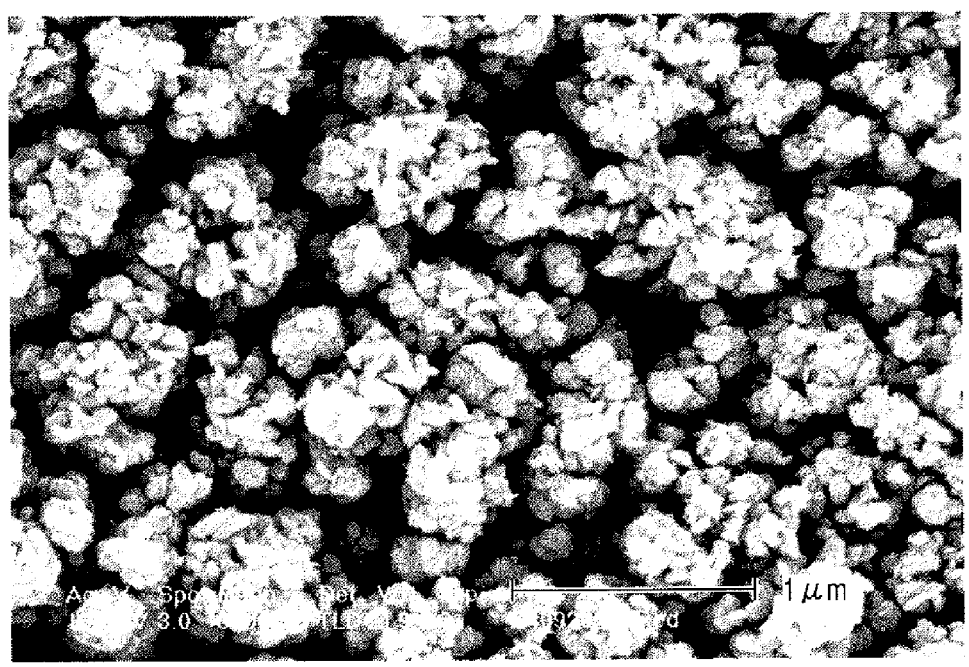
FIG. 9 is a scanning electron microscope (SEM) photograph (magnification: 30,000 times) showing a structure of a catalyst layer of Example 7 of the present invention.

Subsequently, the dendritic composite oxide catalyst was subjected to reduction treatment at 120° C. for 30 minutes in a 2% $H_2$/He atmosphere at 0.1 MPa (1 atm), to thereby obtain a dendritic composite metal catalyst layer having a structure shown in FIG. 9 on a PTFE sheet. No great changes were observed before and after the reduction treatment. The results of XPS and EDX analyses confirmed that the dendritic composite metal catalyst was composed of a composite metal of Pt and Cu with an atom number ratio of about 77 to 23. An amount of Pt supported was 1.60 mg/cm$^2$, and the catalyst layer had a porosity of 80%.

Then, an appropriate amount of a Nafion solution (5 wt %, available from Wako Pure Chemical Industries, Ltd.) was dropped onto the obtained catalyst layer, and a solvent was evaporated in vacuum, to thereby form an electrolyte channel on a catalyst surface.

The subsequent steps were performed in the same manner as in Example 5, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 10.

Figure 10:
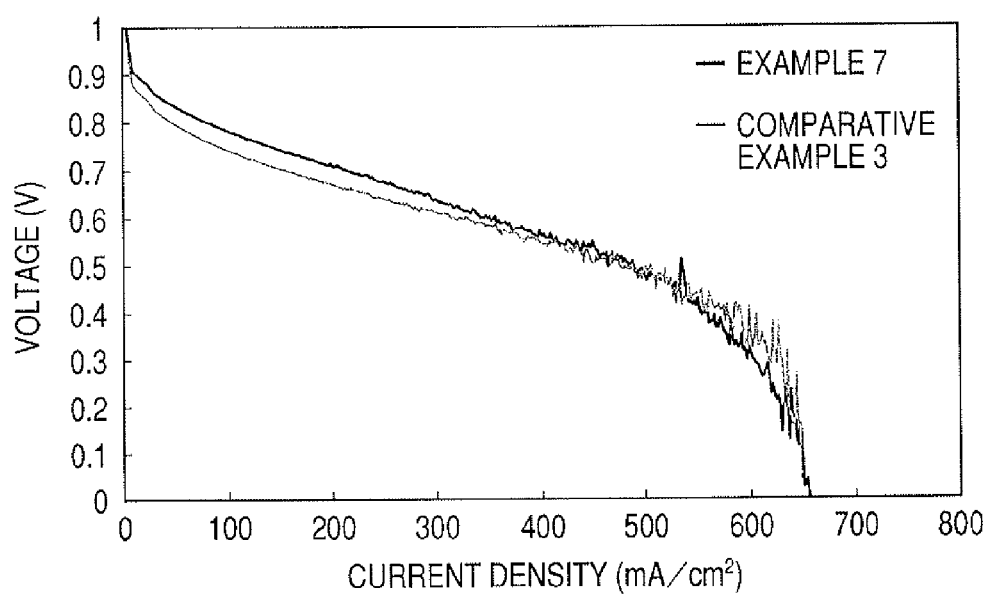
FIG. 10 is a graph showing characteristics of a solid polymer electrolyte fuel cell produced by using a dendritic catalyst layer of Example 7 of the present invention and those of a solid polymer electrolyte fuel cell of Comparative Example 3.

FIG. 10 also shows current-voltage characteristics of an example of a unit cell employing the platinum black catalyst produced in Step 2 of Example 5 for each of the cathode catalyst layer and the anode catalyst layer as Comparative Example 3. An amount of Pt supported in the cathode platinum black catalyst layer was 4.96 mg/cm$^2$, and the cathode platinum black catalyst layer had a thickness of about 30 µm.

First, a current density of the unit cells was compared at 900 mV, which falls within a reaction rate-limiting region, resulting in 14.2 mA/cm$^2$ for Example 7 and 8.1 mA/cm$^2$ for Comparative Example 3. The current density was divided by the amount of Pt supported, to provide a specific catalytic activity. The specific catalytic activity of the unit cells was compared, resulting in 8.87 A/g for Example 7 and 1.63 A/g for Comparative Example 3. That is, in the dendritic composite metal catalyst layer of Example 7, deterioration of fuel cell characteristics due to activation polarization was significantly suppressed compared with that in the catalyst layer of Comparative Example 3. Further, the dendritic composite metal catalyst layer of Example 7 had improved catalyst utilization compared with that of the catalyst layer of Comparative Example 3. Thus, comparable current was obtained with the dendritic composite metal catalyst layer of Example 7 although an amount of Pt supported was about ⅓ of that of Comparative Example 3.

The current density of the unit cells was compared in a limiting current region, resulting in 650 mA/cm$^2$ or more for Example 7, which was comparable to that of Comparative Example 3.

Example 8

Example 8 shows an example of a solid polymer electrolyte fuel cell having a construction shown in FIG. 1 according to an embodiment of the present invention, which was manufactured by using a catalyst layer and a manufacturing method according to the present invention.

Hereinafter, detailed description will be made of only step of the manufacturing step of the solid polymer electrolyte fuel cell according to Example 8, which differs in construction and manufacturing method from those of Example 5.

(Step 1)

Figure 11A:
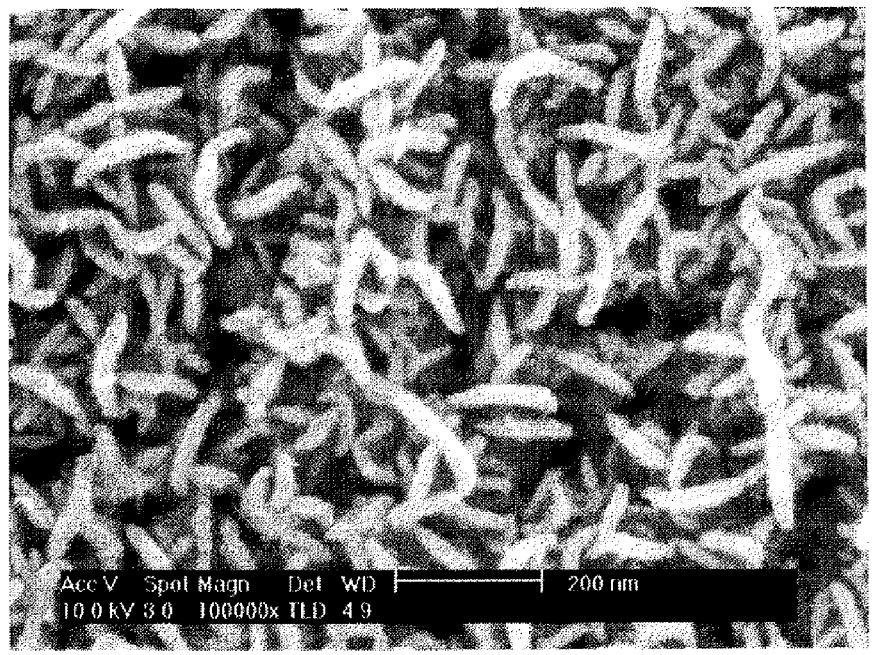
FIG. 11A is a scanning electron microscope (SEM) photograph showing a surface structure of a catalyst layer of Example 8 of the present invention.
Figure 11B:
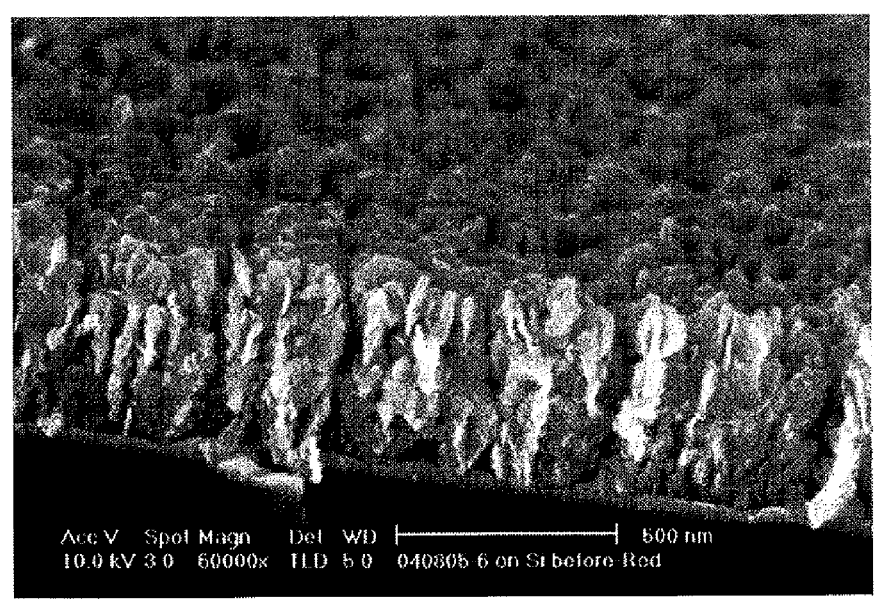
FIG. 11B is a scanning electron microscope (SEM) photograph showing a sectional structure of the catalyst layer of Example 8 of the present invention.

A gold thin film was formed to a thickness of 50 nm through electron beam vacuum evaporation on a PTFE sheet (NITOFLON, available from Nitto Denko Corporation) as a transfer layer to a polymer electrolyte membrane. Further, a platinum oxide layer and a platinum oxide-copper oxide composite layer were alternatively and repeatedly deposited thereon through reactive sputtering, to thereby form a dendritic composite oxide-catalyst layer shown in FIGS. 11A and 11B and having a thickness of 1,100 nm. Each platinum oxide layer was deposited to a thickness of 60 nm, and each composite oxide layer was deposited to a thickness of 20 nm. The reactive sputtering was performed under the conditions of: a total pressure of 5 Pa; an oxygen flow ratio ($Q_{O2}/(Q_{Ar}+Q_{O2})$) of 70%; a substrate temperature of 25° C.; an RF input power for the Pt cathode of 3.6 W/cm$^2$; and an RF input power for the Cu cathode of 8.7 W/cm$_2$. The results of XPS and EDX analyses confirmed that the dendritic composite oxide catalyst was composed of a composite of platinum oxide and CuO with a molecule number ratio of about 73 to 27.

Subsequently, the dendritic composite oxide catalyst was subjected to reduction treatment at 120° C. for 30 minutes in a 2% H$_2$/He atmosphere at 0.1 MPa (1 atm), to thereby obtain a dendritic composite metal catalyst layer on a PTFE sheet. No great changes were observed before and after the reduction treatment. The results of XPS and EDX analyses confirmed that the dendritic composite metal catalyst was composed of a composite metal of Pt and Cu with an atom number ratio of about 73 to 27. An amount of Pt supported was 0.36 mg/cm$^2$, and the catalyst layer had a porosity of 76.5%. Then, an appropriate amount of a Nafion solution (5 wt %, available from Wako Pure Chemical Industries, Ltd.) was dropped onto the obtained catalyst layer, and a solvent was evaporated in vacuum, to thereby form an electrolyte channel on a catalyst surface.

The subsequent steps were performed in the same manner as in Example 5, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 12.

Figure 12:
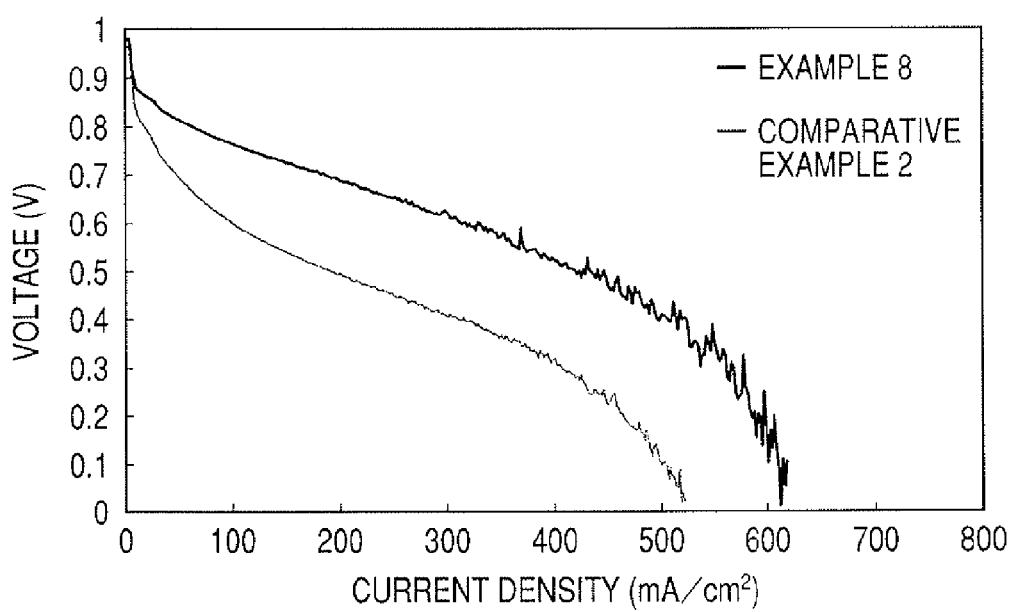
FIG. 12 is a graph showing characteristics of a solid polymer electrolyte fuel cell produced by using a dendritic catalyst layer of Example 8 of the present invention and those of a solid polymer electrolyte fuel cell of Comparative Example 2.

FIG. 12 also shows current-voltage characteristics of an example of a unit cell employing the platinum black catalyst layer produced in Step 2 of Example 5 for the anode catalyst layer and the platinum-supported carbon catalyst layer produced in Step 2 of Example 1 for the cathode catalyst layer as Comparative Example 2.

First, a current density of the unit cells was compared at 900 mV, which falls within a reaction rate-limiting region, resulting in 7.5 mA/cm$^2$ for Example 8 and 2.0 mA/cm$^2$ for Comparative Example 2. The current density was divided by the amount of Pt supported, to provide a specific catalytic activity. The specific catalytic activity of the unit cells was compared, resulting in 20.7 A/g for Example 8 and 5.7 A/g for Comparative Example 2. That is, the catalyst layer of Example 8 had improved catalytic activity compared with that of the catalyst layer of Comparative Example 2.

The current density of the unit cells was compared in a limiting current region, resulting in 600 mA/cm$^2$ or more for Example 8, and 520 mA/cm$^2$ for that of Comparative Example 2.

That is, the catalyst layer of Example 8 had improved substance transport performance in the catalyst layer compared with that of the catalyst layer of Comparative Example 2, and thus deterioration of fuel cell characteristics due to diffusion polarization was significantly suppressed.

Example 9

Example 9 shows an example of a solid polymer electrolyte fuel cell having a construction shown in FIG. 1 according to an embodiment of the present invention, which was manufactured by using a catalyst layer and a manufacturing method according to the present invention.

Hereinafter, detailed description will be made of only Step 1 of the manufacturing step of the solid polymer electrolyte fuel cell according to Example 9, which differs in construction and manufacturing method from those of Example 1.

(Step 1)

In Step 1, a dendritic catalyst layer of the present invention was produced.

Figure 13:
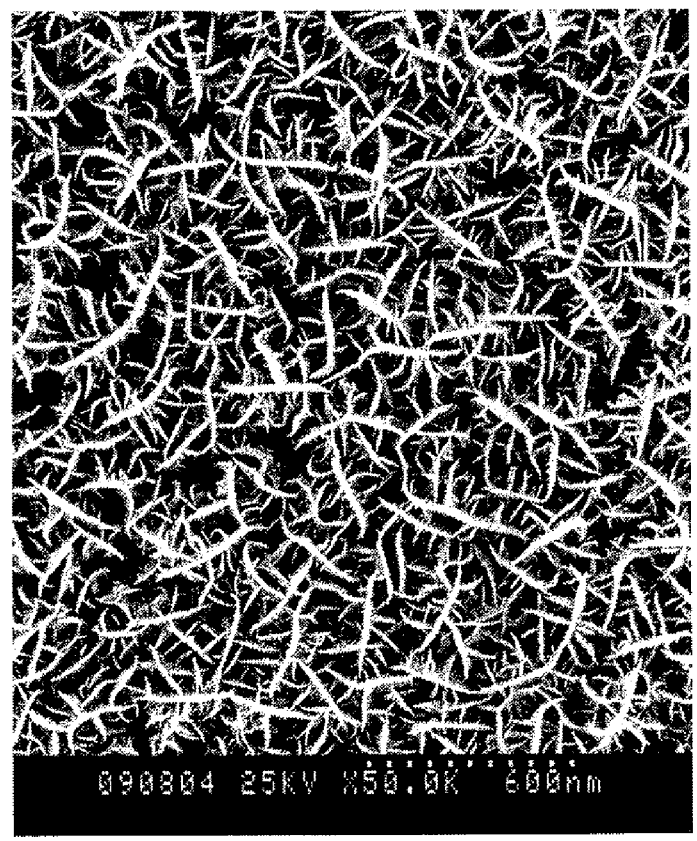
FIG. 13 is a scanning electron microscope (SEM) photograph (magnification: 50,000 times) showing a structure of a catalyst layer of Example 9 of the present invention.

A gold fine particle layer as catalyst support was formed to a thickness of 50 nm through electron beam evaporation on a PTFE sheet (NITOFLON, available from Nitto Denko Corporation) as a transfer layer to a polymer electrolyte membrane. Further, a platinum oxide catalyst with a dendritic structure shown in FIG. 13 was formed thereon to a thickness of 1,000 nm through reactive ion plating. At this time, an amount of Pt supported was 0.36 mg/cm$^2$. The reactive ion plating was performed under the conditions of: a platinum target; a total pressure of 0.12 Pa; an atmosphere of 100% O$_2$; a substrate temperature of 80° C.; an RF input power of 3.5 W/cm$^2$; and an evaporation electron beam of 150 mA and 10 kV. Subsequently, the platinum oxide catalyst with a dendritic structure was subjected to reduction treatment at 120° C. for 30 minutes in a 2% H$_2$/He atmosphere at 0.1 MPa (1 atm), to thereby obtain a platinum/gold catalyst layer with a dendritic structure on a PTFE sheet.

Then, a mixed suspension of PTFE and Nafion was applied thereon for effective formation of an electrolyte channel on a catalyst surface and appropriate water repellent treatment.

The subsequent steps were performed in the same manner as in Example 1, to thereby form a unit cell.

The unit cell produced through the above-described steps was subjected to characteristic evaluation by using evaluation equipment having a construction shown in FIG. 3. An electrical discharge test was performed at a cell temperature of 80° C. while a hydrogen gas was supplied to the anode 8 and an air was supplied to the cathode 9, to thereby obtain current-voltage characteristics shown in FIG. 14.

Figure 14:
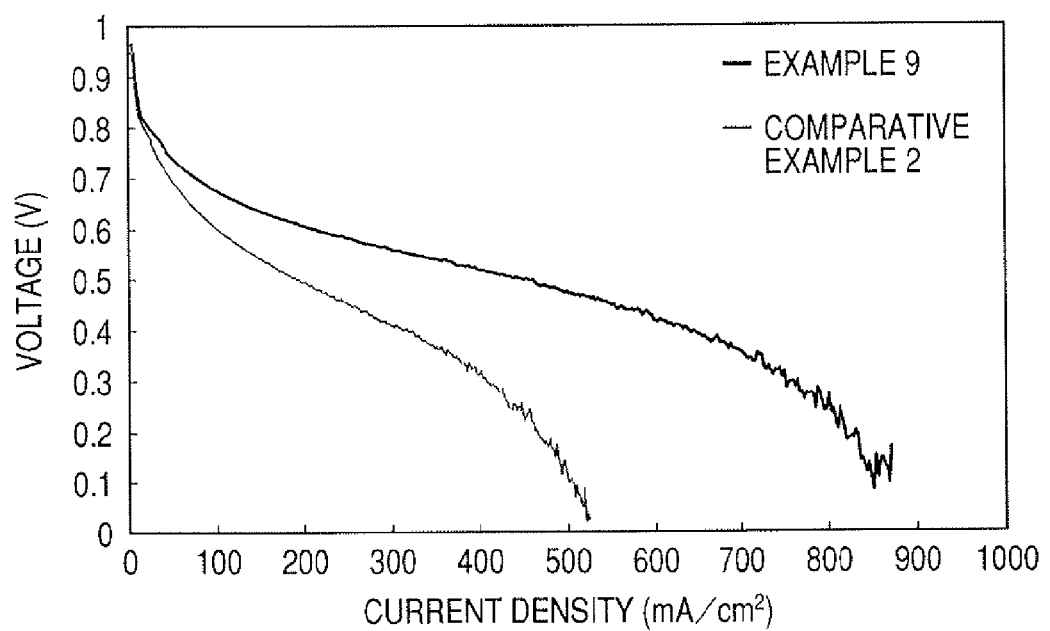
FIG. 14 is a graph showing characteristics of a solid polymer electrolyte fuel cell produced by using a dendritic catalyst layer of Example. 9 of the present invention and those of a solid polymer electrolyte fuel cell of Comparative Example 1.

FIG. 14 also shows current-voltage characteristics of an example of a unit cell employing the platinum-supported carbon catalyst produced in Step 2 of Example 1 for each of the cathode catalyst layer and the anode catalyst layer as Comparative Example 1.

First, a current density of the unit cells was compared at 900 mV, which falls within a reaction rate-limiting region, resulting in 6.9 in A/cm$^2$ for Example 9 and 2.0 mA/cm$^2$ for Comparative Example 1. The current density was divided by the amount of Pt supported, to provide a specific catalytic activity. The specific catalytic activity of the unit cells was compared, resulting in 19.2 A/g for Example 9 and 5.7 A/g for Comparative Example 1. That is, the catalyst layer of Example 9 had improved catalytic activity compared with that of the catalyst layer of Comparative Example 1.

The current density of the unit cells was compared in a limiting current region, resulting in 800 mA/cm² or more for Example 9 and 520 mA/cm² for Comparative Example 1. That is, the catalyst layer of the Example 9 had improved substance transport performance in the catalyst layer compared with that in the catalyst layer of Comparative Example 1, and thus deterioration of fuel cell characteristics due to diffusion polarization was significantly suppressed.

As shown in Examples, a dendritic catalyst layer or catalyst layer with a multilayer structure having at least one layer with a dendritic structure of the present invention was used as a catalyst layer for a solid polymer electrolyte fuel cell, to thereby obtain a fuel cell having excellent fuel cell characteristics with improved catalytic activity and catalyst utilization, and improved substance transport performance. Further, a method of producing a dendritic catalyst layer or catalyst layer with a multilayer structure having at least one layer with a dendritic structure of the present invention involves a simple process at low cost and good reproducibility, to thereby realize a solid polymer electrolyte fuel cell having stable characteristics at low cost.

Industrial Applicability

The dendritic catalyst layer or catalyst layer with a multilayer structure having at least one layer with the dendritic structure of the present invention has improved catalytic activity and catalyst utilization, and improved substance transport performance in the catalyst layer, and thus can be used as a catalyst layer for a solid polymer electrolyte fuel cell.

The solid polymer electrolyte fuel cell having the dendritic catalyst layer of the present invention can be used as a fuel cell for small electrical instruments such as cellular phones, laptop computers, and digital cameras.

This application claims priority from Japanese Patent Application Nos. 2004-194791 filed on Jun. 30, 2004 and 2005-158097 filed on May 30, 2005, which are hereby incorporated by reference herein.

The invention claimed is:

1. A catalyst layer for a solid polymer electrolyte fuel cell comprising:
 a solid polymer electrolyte membrane;
 an electrode; and
 a catalyst layer provided between the solid polymer electrolyte membrane and the electrode,
 wherein the catalyst layer comprises a catalyst material that has a dendritic shape, which is formed by a process comprising reactive sputtering at a total pressure of 0.12 to 5 Pa, an oxygen flow ratio of 70 to 100%, a substrate temperature of 25 to 200° C., and an input power of 3.5 to 5.5 W/cm².

2. A catalyst layer for a solid polymer electrolyte fuel cell, comprising a catalyst with a multilayer structure having at least one layer that is the catalyst layer according to claim 1.

3. The catalyst layer for a solid polymer electrolyte fuel cell according to claim 1, wherein the catalyst material is: platinum oxide; a composite oxide of platinum oxide and an oxide of a metal element except platinum; platinum obtained through reduction treatment of the platinum oxide or the composite oxide; a multicomponent metal containing platinum; a mixture of platinum and an oxide of a metal element except platinum; or a mixture of a multicomponent metal containing platinum and an oxide of a metal element except platinum.

4. The catalyst layer for a solid polymer electrolyte fuel cell according to claim 3, wherein the metal element except platinum comprises at least one metal selected from the group consisting of Al, Si, Ti, V, Cr, Fe, Co, Ni, Cu, Zn, Ge, Zr, Nb, Mo, Ru, Rh, Pd, Ag, In, Sn, Hf, Ta, W, Os, Ir, Au, La, Ce, and Nd.

5. The catalyst layer for a solid polymer electrolyte fuel cell according to claim 1, wherein the catalyst material that has the dendritic shape has a branch or branched piece with a width of 5 nm or more and 200 nm or less.

6. The catalyst layer for a solid polymer electrolyte fuel cell according to claim 1, wherein the catalyst layer has a porosity of 30% or more and less than 95%.

7. The catalyst layer for a solid polymer electrolyte fuel cell according to claim 1, wherein the catalyst material is arranged on a catalyst support.

8. The catalyst layer for a solid polymer electrolyte fuel cell according to claim 7, wherein the catalyst support comprises one member selected from the group consisting of: a carbon support; a platinum-supported carbon support; platinum alloy-supported carbon; platinum black; a platinum particle layer; a platinum alloy particle layer; or a gold particle layer.

9. The catalyst layer for a solid polymer electrolyte fuel cell according to claim 8, wherein the platinum alloy is an alloy composed of platinum and at least one metal element selected from the group consisting of Ru, Co, Cr, Ni, Cu, Fe, V, Sn, Rh, In, Pd, and Ru.

10. A method of producing the catalyst layer for a solid polymer electrolyte fuel cell according to claim 1, comprising forming a catalyst material that has a dendritic shape through reactive sputtering at a total pressure of 0.12 to 5 Pa, an oxygen flow ratio of 70 to 100%, a substrate temperature of 25 to 200° C., and an input power of 3.5 to 5.5 W/cm².

11. The method of producing the catalyst layer for a solid polymer electrolyte fuel cell according to claim 10, wherein a mean free path of an evaporated atom is 1 cm or less in the reactive vacuum deposition.

12. A solid polymer electrolyte fuel cell comprising:
 a solid polymer electrolyte membrane;
 a pair of electrodes; and
 catalyst layers each provided between the solid polymer electrolyte and the respective electrode,
 wherein at least one catalyst layer comprises a catalyst material that has a dendritic shape, which is formed by a process comprising reactive sputtering at a total pressure of 0.12 to 5 Pa, an oxygen flow ratio of 70 to 100%, a substrate temperature of 25 to 200° C., and an input power of 3.5 to 5.5 W/cm².

* * * * *